(12) United States Patent
Jeong

(10) Patent No.: US 11,354,248 B2
(45) Date of Patent: Jun. 7, 2022

(54) MEMORY CONTROLLER AND METHOD OF OPERATING THE SAME

(71) Applicant: SK hynix Inc., Icheon (KR)

(72) Inventor: Gi Jo Jeong, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/067,412

(22) Filed: Oct. 9, 2020

(65) Prior Publication Data

US 2021/0406188 A1 Dec. 30, 2021

(30) Foreign Application Priority Data

Jun. 30, 2020 (KR) .......................... 10-2020-0080589

(51) Int. Cl.
| | |
|---|---|
| *G06F 12/00* | (2006.01) |
| *G06F 13/00* | (2006.01) |
| *G06F 13/28* | (2006.01) |
| *G06F 12/0873* | (2016.01) |
| *G06F 12/0891* | (2016.01) |
| *G06F 12/02* | (2006.01) |
| *G06F 13/16* | (2006.01) |
| *G06F 9/30* | (2018.01) |

(52) U.S. Cl.
CPC ...... *G06F 12/0873* (2013.01); *G06F 9/30047* (2013.01); *G06F 12/0238* (2013.01); *G06F 12/0891* (2013.01); *G06F 13/1642* (2013.01); *G06F 13/1673* (2013.01); *G06F 2212/7201* (2013.01)

(58) Field of Classification Search
CPC ............. G06F 12/0875; G06F 13/1642; G06F 13/1673; G06F 9/30047; G06F 3/0659

USPC .......................................................... 711/154
See application file for complete search history.

(56) References Cited

U.S. PATENT DOCUMENTS

| | | |
|---|---|---|
| 5,509,132 A | 4/1996 | Matsuda et al. |
| 5,604,753 A | 2/1997 | Bauer et al. |
| 6,000,006 A | 12/1999 | Bruce et al. |

(Continued)

FOREIGN PATENT DOCUMENTS

| | | |
|---|---|---|
| KR | 10-0293276 B1 | 9/2001 |
| KR | 1020070116792 A | 12/2007 |

(Continued)

OTHER PUBLICATIONS

Final Office Action for U.S. Appl. No. 16/111,044, dated Oct. 7, 2020.

(Continued)

*Primary Examiner* — Edward J Dudek, Jr.
*Assistant Examiner* — Sidney Li

(57) ABSTRACT

A memory controller may include a host interface controller, a first queue, a second queue, and a cache memory. The host interface controller may be configured to generate, based on a request received from a host, one or more command segments corresponding to the request. The first queue may be configured to store the one or more command segments. The second queue may be configured to store a target command segment from among the one or more command segments. The memory controller caches a target map segment corresponding to the target command segment into the cache memory in response to the target command segment being transferred from the first queue to the second queue.

20 Claims, 14 Drawing Sheets

(56) References Cited

U.S. PATENT DOCUMENTS

| | | |
|---|---|---|
| 6,324,620 B1 | 11/2001 | Christenson et al. |
| 6,330,556 B1 | 12/2001 | Chilimbi et al. |
| 6,658,533 B1 | 12/2003 | Bogin et al. |
| 8,046,551 B1 | 10/2011 | Sahin |
| 8,909,860 B2 | 12/2014 | Rao |
| 9,026,737 B1 | 5/2015 | Armangau et al. |
| 2009/0300293 A1 | 12/2009 | Mantor et al. |
| 2011/0022779 A1 | 1/2011 | Lund et al. |
| 2011/0047437 A1 | 2/2011 | Flynn |
| 2011/0072196 A1 | 3/2011 | Forhan et al. |
| 2012/0096059 A1 | 4/2012 | Shimizu et al. |
| 2012/0096217 A1 | 4/2012 | Son et al. |
| 2012/0144448 A1 | 6/2012 | Gunawardena et al. |
| 2012/0166723 A1 | 6/2012 | Araki et al. |
| 2013/0124794 A1 | 5/2013 | Bux et al. |
| 2013/0205097 A1 | 8/2013 | Flynn et al. |
| 2014/0059275 A1 | 2/2014 | Yun et al. |
| 2014/0258628 A1 | 9/2014 | Shivashankaraiah et al. |
| 2014/0281806 A1 | 9/2014 | Sharon et al. |
| 2014/0297603 A1 | 10/2014 | Kim et al. |
| 2015/0347314 A1* | 12/2015 | Lee .................. G06F 12/1009 711/103 |
| 2015/0356019 A1 | 12/2015 | Johar et al. |
| 2015/0370734 A1 | 12/2015 | Mangano et al. |
| 2016/0006461 A1 | 1/2016 | Yin et al. |
| 2016/0070472 A1* | 3/2016 | Takizawa ............. G06F 3/0688 711/103 |
| 2016/0162416 A1 | 6/2016 | Boyd et al. |
| 2016/0328161 A1 | 11/2016 | Huang et al. |
| 2017/0031615 A1 | 2/2017 | Lee |
| 2017/0031626 A1 | 2/2017 | Kim et al. |
| 2017/0131951 A1 | 5/2017 | Miura |
| 2017/0242752 A1 | 8/2017 | Lee |
| 2017/0242785 A1* | 8/2017 | O'Krafka ............. G06F 3/0608 |
| 2018/0004698 A1 | 1/2018 | Brouwer et al. |
| 2018/0006963 A1 | 1/2018 | Brouwer et al. |
| 2018/0130537 A1 | 5/2018 | Kim et al. |
| 2018/0253353 A1 | 9/2018 | Takase |
| 2018/0374550 A1 | 12/2018 | Barndt et al. |
| 2019/0129971 A1 | 5/2019 | Hironaka et al. |
| 2019/0340070 A1 | 11/2019 | Lien et al. |
| 2019/0354413 A1 | 11/2019 | Bivens et al. |
| 2020/0098420 A1 | 3/2020 | Li et al. |
| 2020/0192826 A1 | 6/2020 | Ben-Simon et al. |
| 2020/0310984 A1* | 10/2020 | Choi .................. G06F 12/0246 |
| 2021/0224187 A1 | 7/2021 | Um |
| 2021/0318963 A1 | 10/2021 | Kim |
| 2021/0365207 A1 | 11/2021 | Lee |
| 2021/0365372 A1 | 11/2021 | Kim |

FOREIGN PATENT DOCUMENTS

| | | |
|---|---|---|
| KR | 10-1014040 B1 | 2/2011 |
| KR | 1020140055737 A | 5/2014 |
| KR | 10-2015-0138713 A | 12/2015 |
| KR | 10-2016-0035737 A | 4/2016 |
| KR | 10-1711945 B1 | 3/2017 |
| KR | 10-2017-0070920 A | 6/2017 |
| KR | 10-1790165 B1 | 11/2017 |
| KR | 10-1858159 B1 | 6/2018 |
| KR | 10-2018-0104830 A | 9/2018 |
| KR | 10-2019-0054974 A | 5/2019 |
| KR | 10-2019-0067088 A | 6/2019 |
| KR | 10-1992934 B1 | 6/2019 |
| KR | 10-2019-0082584 A | 7/2019 |
| KR | 10-2002925 B1 | 7/2019 |
| KR | 10-2020-0095103 A | 8/2020 |

OTHER PUBLICATIONS

Office Action dated Sep. 29, 2021 for U.S. Appl. No. 16/991,752.

Non-Final Office Action for related U.S. Appl. No. 16/997,853, dated Dec. 16, 2021.

Non-Final Office Action for related U.S. Appl. No. 17/196,691, dated Mar. 24, 2022.

Final Office Action for related U.S. Appl. No. 16/997,853, dated Apr. 5, 2022.

* cited by examiner

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2020-0080589, filed on Jun. 30, 2020, in the Korean Intellectual Property Office, the entire disclosure of which is incorporated herein by reference.

BACKGROUND

1. Technical Field

Various embodiments of the present disclosure generally relate to an electronic device, and more particularly to a memory controller and a method of operating the memory controller.

2. Related Art

A storage device is a device which stores data under the control of a host device such as a computer or a smartphone. The storage device may include a memory device in which data is stored and a memory controller which controls the memory device. Memory devices are classified into a volatile memory device and a nonvolatile memory device.

The volatile memory device is a memory device in which data is stored only when power is supplied and in which stored data is lost when the supply of power is interrupted. Examples of volatile memory devices may include static random access memory (SRAM) and dynamic random access memory (DRAM).

The nonvolatile memory device may be a memory device in which stored data is retained even when the supply of power is interrupted. Examples of nonvolatile memory devices may include read only memory (ROM), programmable ROM (PROM), electrically programmable ROM (EPROM), electrically erasable and programmable ROM (EEPROM), and flash memory.

SUMMARY

Various embodiments of the present disclosure are directed to a memory controller having improved map caching performance and a method of operating the memory controller.

An embodiment of the present disclosure may provide for a memory controller. The memory controller may include a host interface controller, a first queue, a second queue, and a cache memory. The host interface controller may be configured to generate, based on a request received from a host, one or more command segments corresponding to the request. The first queue may be configured to store the one or more command segments. The second queue may be configured to store a target command segment from among the one or more command segments. The memory controller caches a target map segment corresponding to the target command segment into the cache memory in response to the target command segment being transferred from the first queue to the second queue.

An embodiment of the present disclosure may provide for a method of operating a memory controller, the memory controller including a first queue, a second queue, a cache memory, and a host interface controller. The method may include generating, by the host interface controller based on a request from a host, one or more command segments corresponding to the request; storing the one or more command segments in the first queue; transferring a target command segment, among the one or more command segments, from the first queue to the second queue; and caching, by the host interface controller, a target map segment corresponding to the target command segment into the cache memory in response to the target command segment being transferred from the first queue to the second queue.

An embodiment of the present disclosure may provide for a memory controller for controlling a memory device. The memory controller may include a host interface controller, a memory operation controller, a buffer memory, and a cache memory. The host interface controller may be configured to generate, based on a request received from a host, one or more command segments corresponding to the request. The memory operation controller may be configured to control an operation of the memory device based on a target command segment, among the one or more command segments. The buffer memory may be configured to store pieces of logical-to-physical address mapping information of the memory device. The host interface controller may be configured to cache a target map segment corresponding to the target command segment, among the pieces of logical-to-physical address mapping information stored in the buffer memory, in the cache memory, and the memory operation controller may be configured to cache map segments corresponding to cache remaining command segments other than the target command segment of the one or more command segments, among the pieces of logical-to-physical address mapping information stored in the buffer memory, in the cache memory.

DETAILED DESCRIPTION

Specific structural or functional descriptions in the embodiments of the present disclosure introduced in this specification or application are exemplified to describe embodiments according to the concept of the present disclosure. The embodiments according to the concept of the present disclosure may be practiced in various forms, and should not be construed as being limited to the embodiments described in the specification or application.

Figure 1:
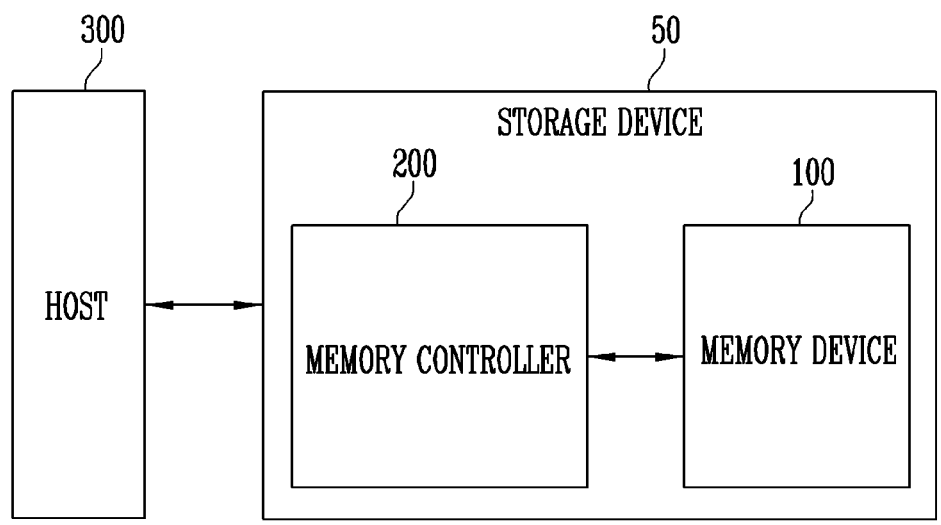
FIG. 1 illustrates a storage device according to an embodiment of the present disclosure.

FIG. 1 is a diagram illustrating a storage device 50 according to an embodiment of the present disclosure.

The storage device 50 may include a memory device 100 and a memory controller 200 which controls the operation of the memory device 100. The storage device 50 may be a device which stores data under the control of a host 300, such as a mobile phone, a smartphone, an MP3 player, a laptop computer, a desktop computer, a game console, a television (TV), a tablet personal computer (PC), or an in-vehicle infotainment system.

The storage device 50 may be manufactured as any one of various types of storage devices depending on a host interface that is provided for communication with the host 300. For example, the storage device 50 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD card, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms, such as, for example, package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may be operated in response to the control of the memory controller 200. The memory device 100 may include a memory cell array including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of pages. A single page may include a plurality of memory cells. In an embodiment, a page may be a unit by which data is stored in the memory device 100 or by which data stored in the memory device 100 is read.

A memory block may be a unit by which data is erased. In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In the present specification, for convenience of description, a description will be made on the assumption that the memory device 100 is a NAND flash memory.

The memory device 100 may receive a command and an address from the memory controller 200, and may access the area of the memory cell array selected by the address. That is, the memory device 100 may perform an operation indicated by the command on the area selected by the address. For example, the memory device 100 may perform any one of a write operation (i.e., a program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

The memory controller 200 controls the overall operation of the storage device 50.

When power is applied to the storage device 50, the memory controller 200 may run firmware (FW). When the memory device 100 is a flash memory device, the memory controller 200 may run firmware such as a flash translation layer (FTL) for controlling communication between the host 300 and the memory device 100.

In an embodiment, the memory controller 200 may receive data and a logical block address (LBA) from the host 300, and may translate the logical block address (LBA) into a physical block address (PBA) indicating the address of memory cells which are included in the memory device 100 and in which data is to be stored.

The memory controller 200 may control the memory device 100 so that a program operation, a read operation or an erase operation is performed in response to a request received from the host 300. During the program operation, the memory controller 200 may provide a write command, a physical block address, and data to the memory device 100. During the read operation, the memory controller 200 may provide a read command and a physical block address to the memory device 100. During the erase operation, the memory controller 200 may provide an erase command and a physical block address to the memory device 100.

In an embodiment, the memory controller 200 may autonomously generate a command, an address, and (in some cases) data regardless of whether a request from the host 300 is received, and may transmit the command, the address, and (in some cases) the data to the memory device 100. For example, the memory controller 200 may provide commands, addresses, and data to the memory device 100 so as to perform background operations, such as a program operation for wear leveling and a program operation for garbage collection.

In an embodiment, the memory controller 200 may control at least two memory devices 100. In this case, the memory controller 200 may control the memory devices 100 according to an interleaving scheme to improve operation performance. The interleaving scheme may be an operating manner in which the operating periods of at least two memory devices 100 are caused to overlap each other.

The host 300 may communicate with the storage device 50 using at least one of various communication protocols such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication protocols.

Figure 2:
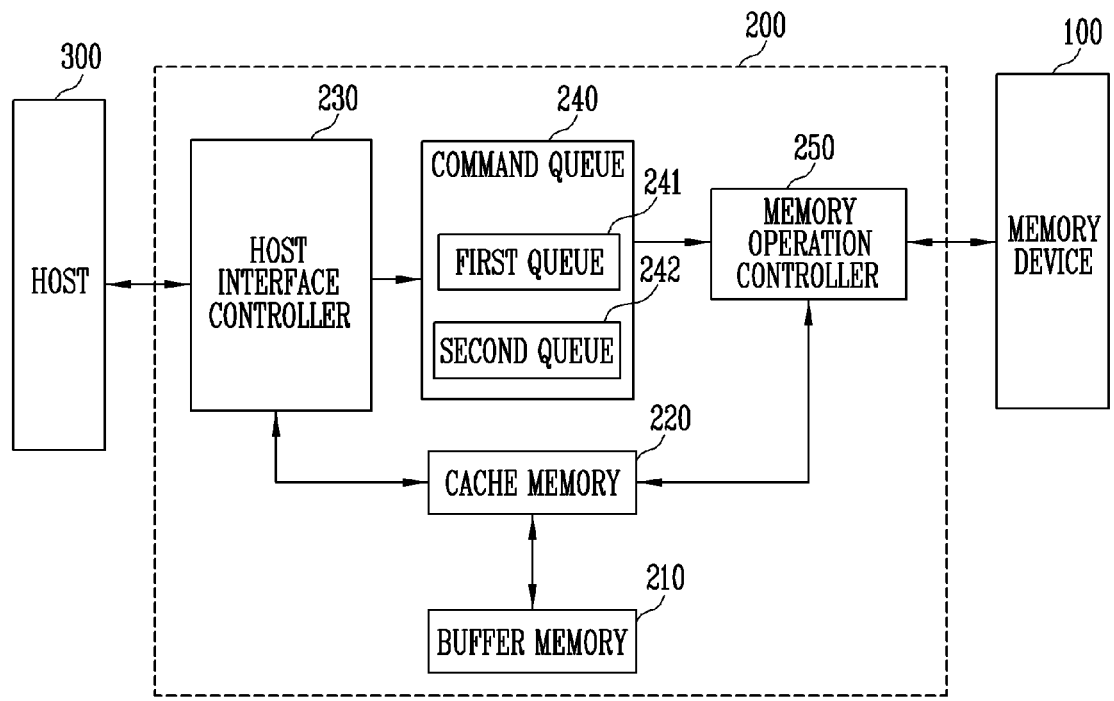
FIG. 2 illustrates the configuration and operation of a memory controller of FIG. 1.

FIG. 2 is a diagram illustrating the configuration and operation of the memory controller of FIG. 1.

Referring to FIG. 2, the memory controller 200 may include a buffer memory 210, a cache memory 220, a host interface controller 230, a command queue 240, and a memory operation controller 250.

The command queue 240 may include a first queue 241 and a second queue 242.

The buffer memory 210 may store pieces of logical-to-physical address mapping information of the memory device 100. The logical-to-physical address mapping information may be information indicating mapping relationships between logical addresses received from a host 300 and physical addresses of the memory device 100 in which data is stored. The logical-to-physical address mapping information may include a plurality of map segments. Each map segment may include a preset number of logical-to-physical address pairs.

The cache memory 220 may store map segments received from the buffer memory 210. The cache memory 220 may be a memory which has capacity less than that of the buffer memory 210, but has a speed higher than that of the buffer memory 210.

The host interface controller 230 may receive a request from the host 300. The host interface controller 230 may generate one or more command segments based on the request received from the host 300. In an embodiment, the unit of the command segment may be Input/Output Operations Per Second (IOPS). For example, one IOPS may be the unit by which 4 kB data is processed, but the amount of data processed by one IOPS in the embodiment is not limited thereto.

For example, the host interface controller 230 may receive 32 KB write data and a write request from the host 300. A description will be made on the assumption that the amount of data to be programmed in a write operation that is performed in response to one write command segment is 4 kB. In this case, the host interface controller 230 may generate eight write command segments (corresponding to eight IOPS) based on the received write request.

The host interface controller 230 may receive information about a logical address at which data is to be stored, together with the write request, from the host 300. The logical address information received from the host 300 may include one or more logical address segments. The one or more logical address segments may correspond to one or more write command segments, respectively.

In other examples, the host interface controller 230 may receive a read request for 32-KB data stored in the memory device 100 from the host 300. A description will be made on the assumption that the amount of data to be read in a read operation that is performed in response to one read command segment is 4 KB. In this case, the host interface controller 230 may generate eight read command segments (corresponding to eight IOPS) based on the received read request.

The host interface controller 230 may receive information about a logical address at which data is stored, together with the read request, from the host 300. The logical address information received from the host 300 may include one or more logical address segments. The one or more logical address segments may correspond to one or more read command segments, respectively.

In an embodiment, the host interface controller 230 may store the generated one or more command segments in the first queue 241. When a target command segment among the command segments stored in the first queue 241 is transferred to the second queue 242, the host interface controller 230 may cache into the cache memory 220 a target map segment from among the pieces of logical-to-physical address mapping information stored in the buffer memory 210. The target map segment may include information about an address at which a memory operation corresponding to the target command segment is to be performed. The memory operation may be a read operation, a program operation, or an erase operation.

In an embodiment, the host interface controller 230 may cache into the cache memory 220 a map segment corresponding to a first command segment from among the pieces of logical-to-physical address mapping information stored in the buffer memory 210. The first command segment may be a command segment corresponding to a first sequential position, that is, a first-ordered command segment, among one or more command segments. The sequence of the one or more command segments may be determined depending on the range of logical address segments corresponding to the command segments.

For example, the host interface controller 230 may receive a read request corresponding to LBA1 to LBA100 from the host 300. Assuming that the host interface controller 230 generates first to fourth read command segments based on the read request, the range of a first logical address segment corresponding to the first read command segment may range from LBA1 to LBA25. The range of a second logical address segment corresponding to the second read command segment may range from LBA26 to LBA50. The range of a third logical address segment corresponding to the third read command segment may range from LBA51 to LBA75. The range of a fourth logical address segment corresponding to the fourth read command segment may range from LBA76 to LBA100.

Among the first to fourth read command segments, a first command segment may be a read command segment for which the range of a logical address segment precedes other logical address segment ranges. In the example above, the first command segment may be the read command segment corresponding to LBA1 to LBA25, that is, the first read command segment. However, how the first command segment is determined is not limited to the present embodiment.

In an embodiment, the memory operation controller 250 may cache into the cache memory 220 map segments corresponding to the remaining command segments from among the pieces of logical-to-physical address mapping information stored in the buffer memory 210. The remaining command segments may be the one or more command segments except the first command segment. In the example above, the remaining command segments may be the second to fourth read command segments.

The command queue 240 may store the command segments generated by the host interface controller 230, and may provide the stored command segments to the memory operation controller 250.

The first queue 241 may be a pending queue (Pending Q). The first queue 241 may store the one or more command segments generated by the host interface controller 230. The first queue 241 may subsequently provide the stored one or more command segments to the second queue 242. The first queue 241 may sequentially provide the command segments to the second queue 242 in the order in which the command segments were input to the first queue 241. The first queue 241 may be a queue which stores command segments that are waiting to be transferred to the second queue 242.

The second queue 242 may be an inter-process communication queue (IPC Q). The second queue 242 may store each command segment received from the first queue 241, and may subsequently provide the stored command segment to the memory operation controller 250. The second queue 242 may be a queue which stores command segments to be processed by the memory operation controller 250. When the memory operation controller 250 is ready to process command segments, the second queue 242 may sequentially provide the command segments to the memory operation controller 250 in the order in which the command segments were input to the second queue 242.

In an embodiment, the size of the second queue 242 may be less than or equal to that of the first queue 241.

The memory operation controller 250 may control the memory device 100 so that a memory operation is performed based on the target command segment received from the second queue 242. To perform the memory operation, the memory operation controller 250 may perform, using a target map segment corresponding to the target command segment, a logical-to-physical address translation for a logical address of the target command segment.

The memory operation controller 250 may access the cache memory 220 and then determine whether the target map segment corresponding to the target command segment is cached in the cache memory 220. When the target map segment is cached in the cache memory 220, a cache hit may occur. When the target map segment is not cached in the cache memory 220, a cache miss may occur.

When a cache hit occurs, the memory operation controller 250 may control the memory device 100 so that the memory operation is performed based on the target map segment cached in the cache memory 220 in response to the target command segment received from the second queue 242.

When a cache miss occurs, the memory operation controller 250 may control the memory device 100 so that the memory operation is performed based on the target map segment from among the pieces of mapping information stored in the buffer memory 210 in response to the target command segment received from the second queue 242. When a cache miss occurs, the memory operation controller 250, rather than the host interface controller 230, may cache into the cache memory 220 the target map segment from among the pieces of mapping information stored in the buffer memory 210.

Since the operating speed of the cache memory 220 is higher than that of the buffer memory 210, the memory operation may be processed faster in the event of a cache hit than when a cache miss occurs.

The memory operation controller 250 may control the memory device 100 so that a device management operation is performed based on management initiation information.

The management initiation information may include at least one of size information of data received from the host 300 and timer information initialized whenever the device management operation is performed.

The device management operation may include at least one of a block erase operation for preparing a block in which write data is to be stored, a garbage collection operation of securing a free block, and a map update operation of flushing the mapping information stored in the buffer memory into the memory device. However, embodiments are not limited to these examples of device management operations.

The memory operation controller 250 may perform, based on the management initiation information, the device management operation whenever the amount of data received from the host 300 reaches a predetermined amount. The memory operation controller 250 may perform the device management operation based on the management initiation information, and may perform the device management operation whenever a predetermined period of time has elapsed.

The memory operation controller 250 may be ready to process command segments when a device management operation is not being performed. The memory operation controller 250 may control the memory device 100 so that the memory operation is performed in response to the target command segment received from the second queue 242 while a device management operation is not being performed.

Figure 3:
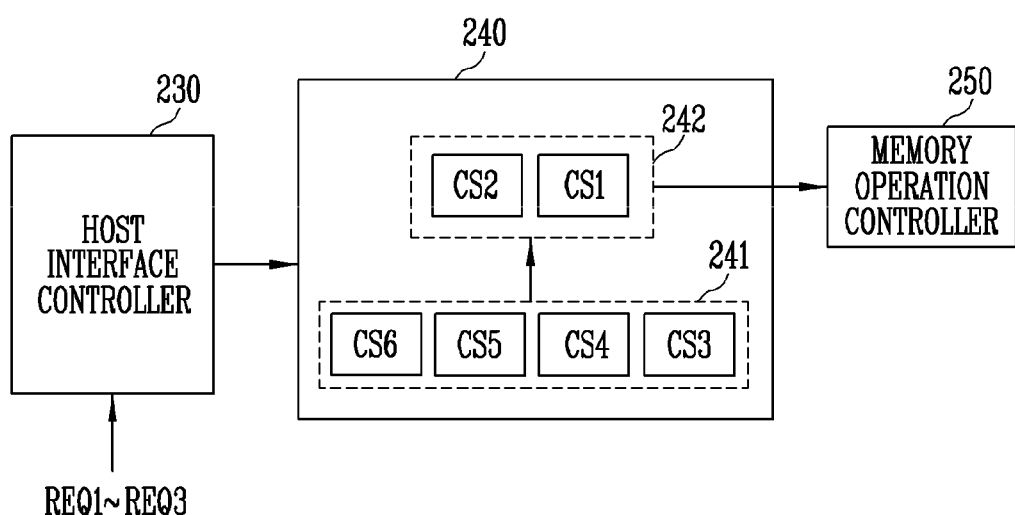
FIG. 3 illustrates the operation of a command queue of FIG. 2.

FIG. 3 is a diagram illustrating the operation of the command queue 240 of FIG. 2.

Referring to FIG. 3, a host interface controller 230 may sequentially receive first to third requests REQ1 to REQ3 from a host.

The host interface controller 230 may generate first and second command segments CS1 and CS2 based on the first request REQ1. The host interface controller 230 may generate a third command segment CS3 based on the second request REQ2. The host interface controller 230 may generate fourth, fifth and sixth command segments CS4, CS5, and CS6 based on the third request REQ3. The number of command segments that are generated based on each request may be determined according to the amount of data to be processed in response to that request.

The first queue 241 may store the third to sixth command segments CS3 to CS6. The second queue 242 may store the first and second command segments CS1 and CS2. The first and second command segments CS1 and CS2 may be command segments that were stored in the first queue 241 after being generated by the host interface controller 230, and then were subsequently transferred from the first queue 241 to the second queue 242.

The second queue 242 may provide the first and second command segments CS1 and CS2 to a memory operation controller 250. The second queue 242 may provide the first command segment CS1 to the memory operation controller 250 prior to the second command segment CS2, according to the order in which the command segments were input to the second queue 242. The second queue 242 may provide each of the command segments to the memory operation controller 250 when the memory operation controller 250 is ready to process that command segment.

The memory operation controller 250 may control the memory device 100 so that a memory operation is performed based on a command segment received from the second queue 242 while a device management operation is not being performed.

Figure 4A:
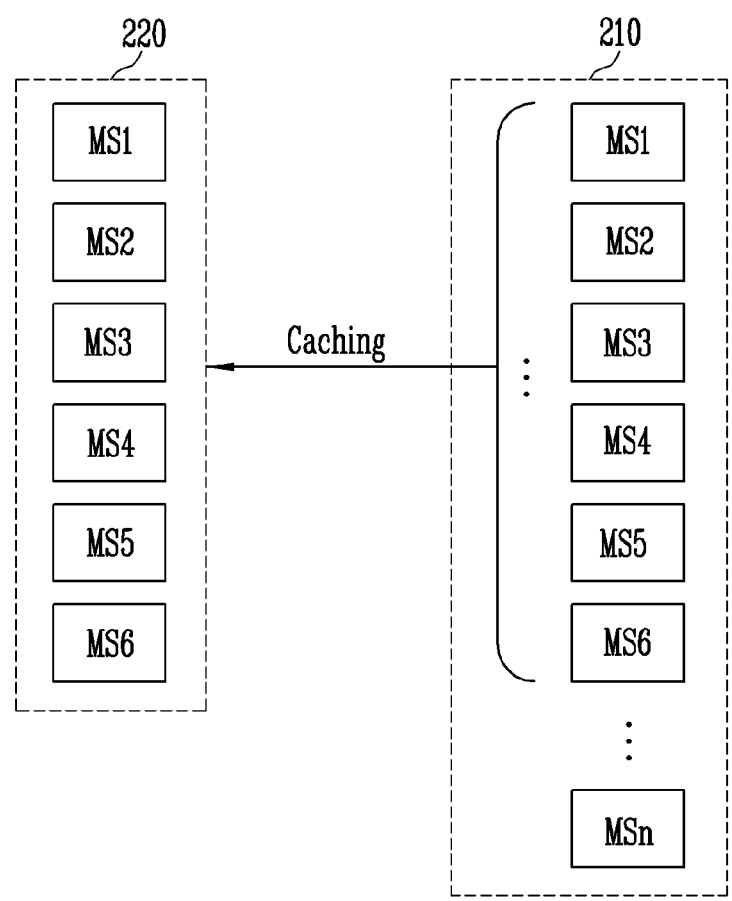
FIG. 4A illustrates caching of map segments according to an embodiment.

FIG. 4A is a diagram illustrating caching of map segments according to an embodiment.

Referring to FIG. 4A, the buffer memory 210 may include pieces of logical-to-physical address mapping information of a memory device. The mapping information may include a plurality of map segments MS1 to MSn (where n is a natural number of 1 or more).

The first to sixth map segments MS1 to MS6, among pieces of mapping information stored in the buffer memory 210, may be cached in the cache memory 220. The first to sixth map segments MS1 to MS6 may respectively correspond to first to sixth command segments CS1 to CS6, described with reference to FIG. 3.

In other words, the first map segment MS1 may include information about an address at which a memory operation corresponding to the first command segment CS1 is to be performed. The second map segment MS2 may include information about an address at which a memory operation corresponding to the second command segment CS2 is to be performed. Similarly, the sixth map segment MS6 may include information about an address at which a memory operation corresponding to the sixth command segment CS6 is to be performed.

Figure 4B:
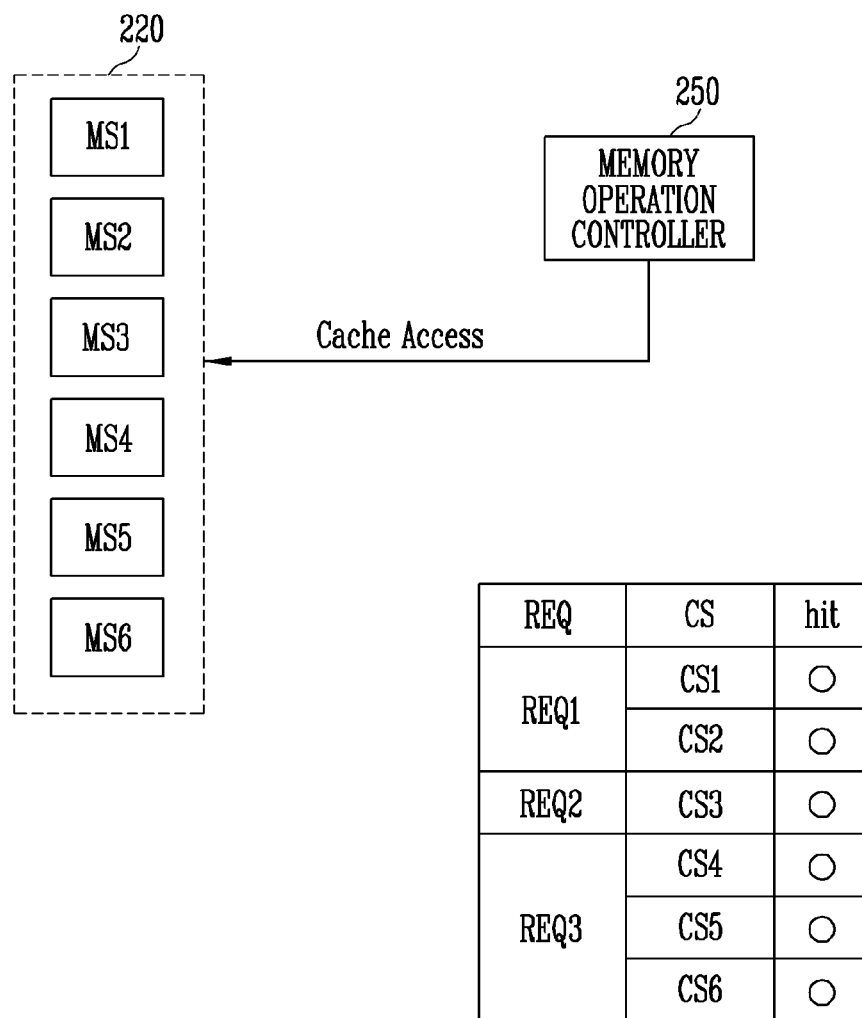
FIG. 4B illustrates cache access according to an embodiment.

FIG. 4B is a diagram illustrating cache access according to an embodiment of FIG. 4A.

Referring to FIG. 4B, in response to the command segment received from the second queue 242, described above with reference to FIG. 3, the memory operation controller 250 may access the cache memory 220 so as to determine whether a map segment corresponding to the command segment is cached in the cache memory 220.

When it is determined that the map segment corresponding to the command segment is cached in the cache memory 220, a cache hit may occur. When it is determined that the map segment corresponding to the command segment is not cached in the cache memory 220, a cache miss may occur.

In FIG. 4B, since the cache memory 220 caches the first to sixth map segments MS1 to MS6 respectively corresponding to the first to sixth command segments CS1 to CS6, described above with reference to FIG. 3, each of the first to sixth command segments CS1 to CS6 may satisfy a cache hit condition when processed by the memory controller 250.

Figure 5A:
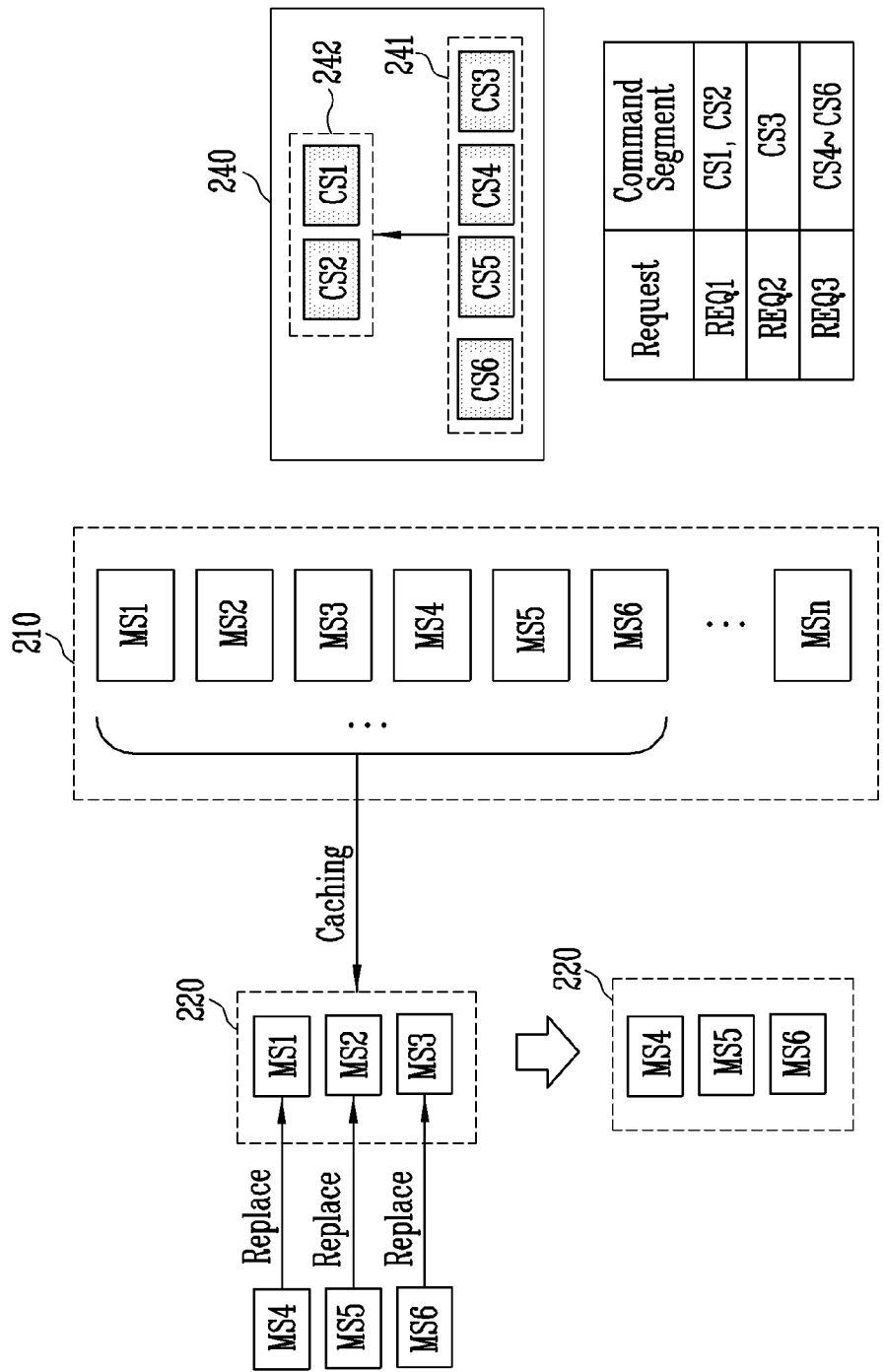
FIG. 5A illustrates caching of map segments according to an embodiment.

FIG. 5A is a diagram illustrating caching of map segments according to another embodiment.

In the example illustrated in FIG. 5A, the capacity of the cache memory 220 may be more limited than that of the buffer memory 210. The description will be made on the assumption that the maximum number of map segments cacheable in the cache memory 220 is 3, but embodiments are not limited to this maximum number of map segments that can be cached in the cache memory 220.

In FIG. 5A, the host interface controller 230, described above with reference to FIG. 3, may be configured to cache in the cache memory 220 a map segment corresponding to a generated command segment from among pieces of mapping information stored in the buffer memory 210 whenever the command segment is generated.

Here, the host interface controller 230 may generate first and second commands CS1 and CS2 based on a first request REQ1, and may store the first and second command segments CS1 and CS2 in the first queue 241. When the first and second command segments CS1 and CS2 are generated, the host interface controller 230 may cache in the cache memory 220 first and second map segments MS1 and MS2 corresponding to the first and second command segments CS1 and CS2 from among the pieces of mapping information stored in the buffer memory 210.

The first and second command segments CS1 and CS2, stored in the first queue 241, may be transferred to the second queue 242.

The host interface controller 230 may generate a third command segment CS3 based on a second request REQ2, and may store the generated third command segment CS3 in the first queue 241. When the third command segment CS3 is generated, the host interface controller 230 may cache in the cache memory 220 a third map segment MS3 corresponding to the third command segment CS3 from among the pieces of mapping information stored in the buffer memory 210.

The host interface controller 230 may generate fourth to sixth command segments CS4 to CS6 in response to a third request REQ3, and may store the generated fourth to sixth command segments CS4 to CS6 in the first queue 241. When the fourth to sixth command segments CS4 to CS6 are generated, the host interface controller 230 may cache in the cache memory 220 fourth, fifth, and sixth map segments MS4, MS5, and MS6 respectively corresponding to the fourth to sixth command segments CS4 to CS6 from among the pieces of mapping information stored in the buffer memory 210.

Because the maximum number of map segments cacheable in the cache memory 220 is 3, the first to third map segments MS1 to MS3 which have been previously cached may be replaced by the fourth to sixth map segments MS4 to MS6 at the time when the forth to sixth command segments CS4 to CS6 are generated.

Figure 5B:
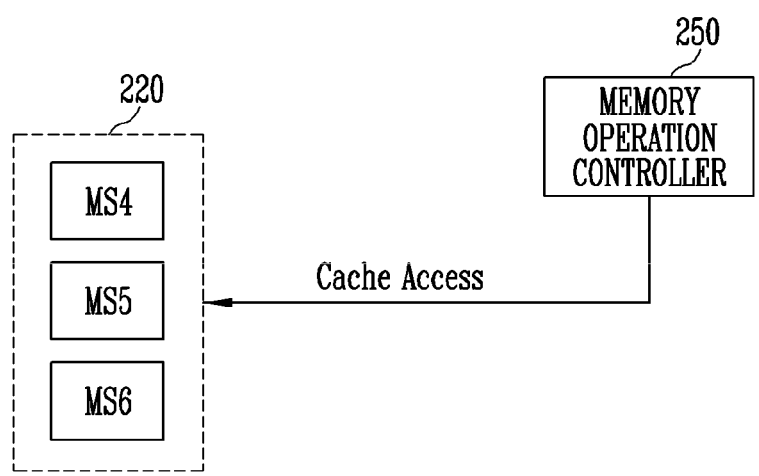
FIG. 5B illustrates cache access according to an embodiment.

FIG. 5B is a diagram illustrating cache access according to an embodiment of FIG. 5A.

In the example of FIG. 5B, the first to third map segments MS1 to MS3 are not cached in the cache memory 220 at the time the first to third command segments CS1 to CS3 are processed by the memory controller 250, and as a result the first to third command segments CS1 to CS3, described above with reference to FIG. 5A, may be processed in a cache miss condition.

Since the fourth to sixth map segments MS4 to MS6 are cached in the cache memory 220, the fourth to sixth command segments CS4 to CS6, described above with reference to FIG. 5A, may be processed in a cache hit condition.

However, when a new command segment has been generated by the time at which the fourth to sixth command segments CS4 to CS6 are to be processed, the fourth to sixth command segments CS4 to CS6 may also be processed in a cache miss condition if the fourth to sixth map segments MS4 to MS6 cached in the cache memory 220 have been replaced by one or more map segments corresponding to one or more new command segments.

Figure 6A:
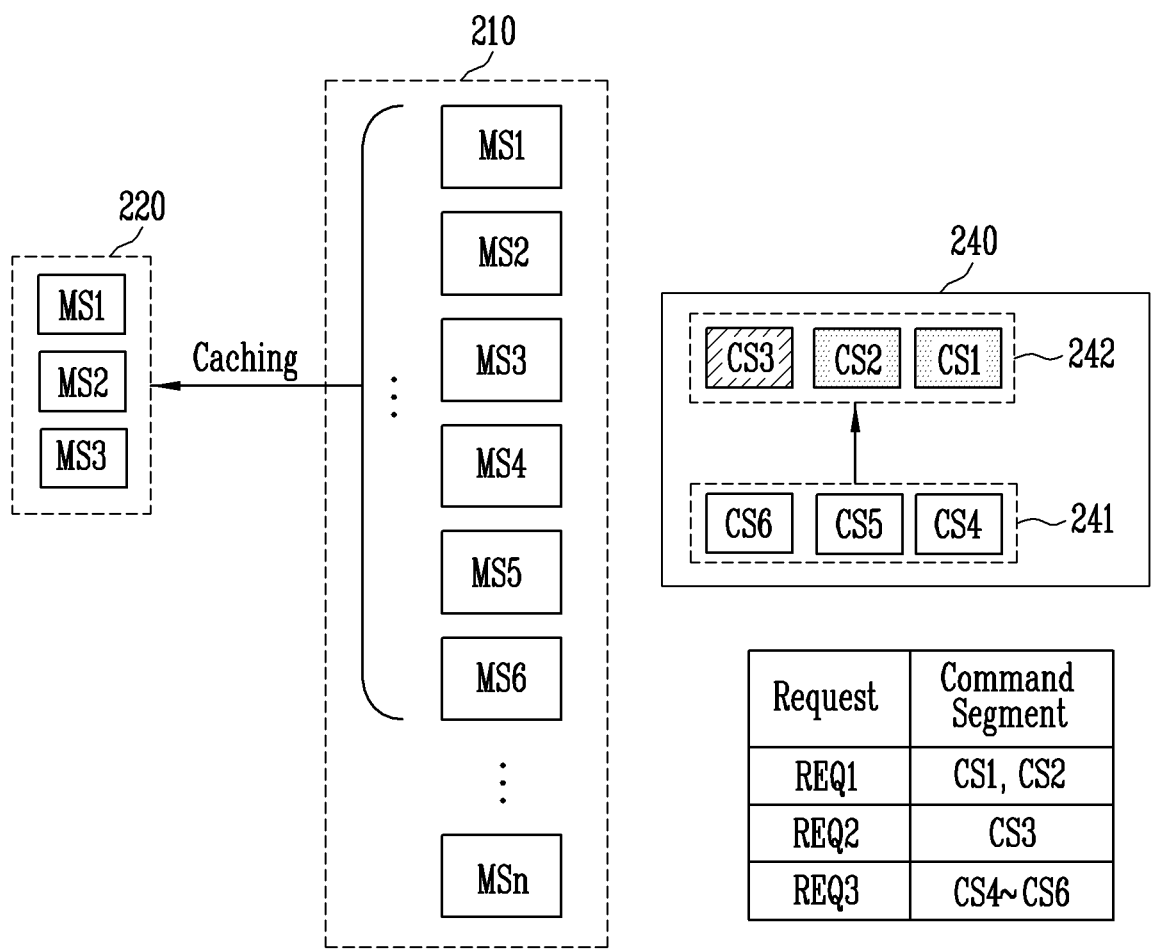
FIG. 6A illustrates caching of map segments according to an embodiment.

FIG. 6A is a diagram illustrating caching of map segments according to another embodiment.

Referring to FIG. 6A, the host interface controller 230, described above with reference to FIG. 3, may cache into the cache memory 220 a map segment corresponding to a transferred command segment from among pieces of mapping information stored in the buffer memory 210 whenever a command segment stored in the first queue 241 is transferred to the second queue 242.

Here, the host interface controller 230 may generate first and second commands CS1 and CS2 based on a first request REQ1, and may store the first and second command segments CS1 and CS2 in the first queue 241.

When the first and second command segments CS1 and CS2 stored in the first queue 241 are transferred to the second queue 242, the host interface controller 230 may cache in the cache memory 220 first and second map segments MS1 and MS2 respectively corresponding to the first and second command segments CS1 and CS2 from among the pieces of mapping information stored in the buffer memory 210.

The host interface controller 230 may generate a third command segment CS3 based on a second request REQ2, and may store the generated third command segment CS3 in the first queue 241.

When the third command segment CS3, stored in the first queue 241, is transferred to the second queue 242, the host interface controller 230 may cache in the cache memory 220 a third map segment MS3 corresponding to the third command segment CS3 from among the pieces of mapping information stored in the buffer memory 210.

The host interface controller 230 may generate fourth to sixth command segments CS4 to CS6 in response to a third request REQ3, and may store the generated fourth to sixth command segments CS4 to CS6 in the first queue 241.

In FIG. 6A, since the fourth to sixth command segments CS4 to CS6, stored in the first queue 241, are not yet transferred to the second queue 242, fourth to sixth map segments MS4 to MS6 respectively corresponding to the fourth to sixth command segments CS4 to CS6 from among the pieces of mapping information stored in the buffer memory 210, may not yet be cached in the cache memory 220. The fourth to sixth map segments MS4 to MS6 may subsequently be cached in the cache memory 220 when the fourth to sixth command segments CS4 to CS6 are transferred from the first queue 241 to the second queue 242, respectively.

Figure 6B:
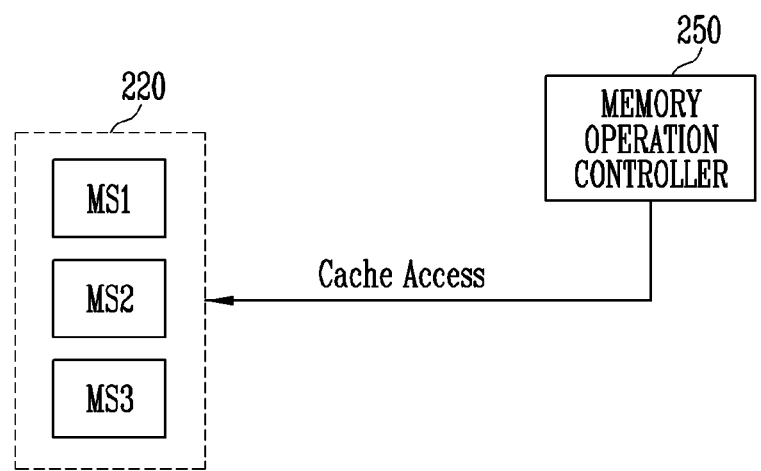
FIG. 6B illustrates cache access according to an embodiment.

FIG. 6B is a diagram illustrating cache access according to the embodiment of FIG. 6A.

Referring to FIG. 6B, the first to third map segments MS1 to MS3 are cached in the cache memory 220, and thus the first to third command segments CS1 to CS3, described above with reference to FIG. 6A, may be processed in a cache hit condition.

After the first to third command segments CS1 to CS3 have been processed, the fourth to sixth command segments CS4 to CS6 may be processed. The fourth to sixth command segments CS4 to CS6 may be processed when being transferred to the memory operation controller 250 via the first queue 241 and the second queue 242. When the fourth to sixth command segments CS4 to CS6 are transferred from the first queue 241 to the second queue 242, fourth to sixth map segments MS4 to MS6 corresponding to the fourth to sixth command segments CS4 to CS6 may be cached in the cache memory 220. Therefore, the fourth to sixth command segments CS4 to CS6 may be processed in a cache hit condition.

That is, when the command segment stored in the first queue 241 is transferred to the second queue 242 (instead of when the command segment is generated by the host interface controller 230), a map segment corresponding to the command segment is cached in the cache memory 220, and thus the cache memory 220 having limited capacity may be efficiently utilized, and a cache hit ratio for the map segments may be increased.

Figure 7A:
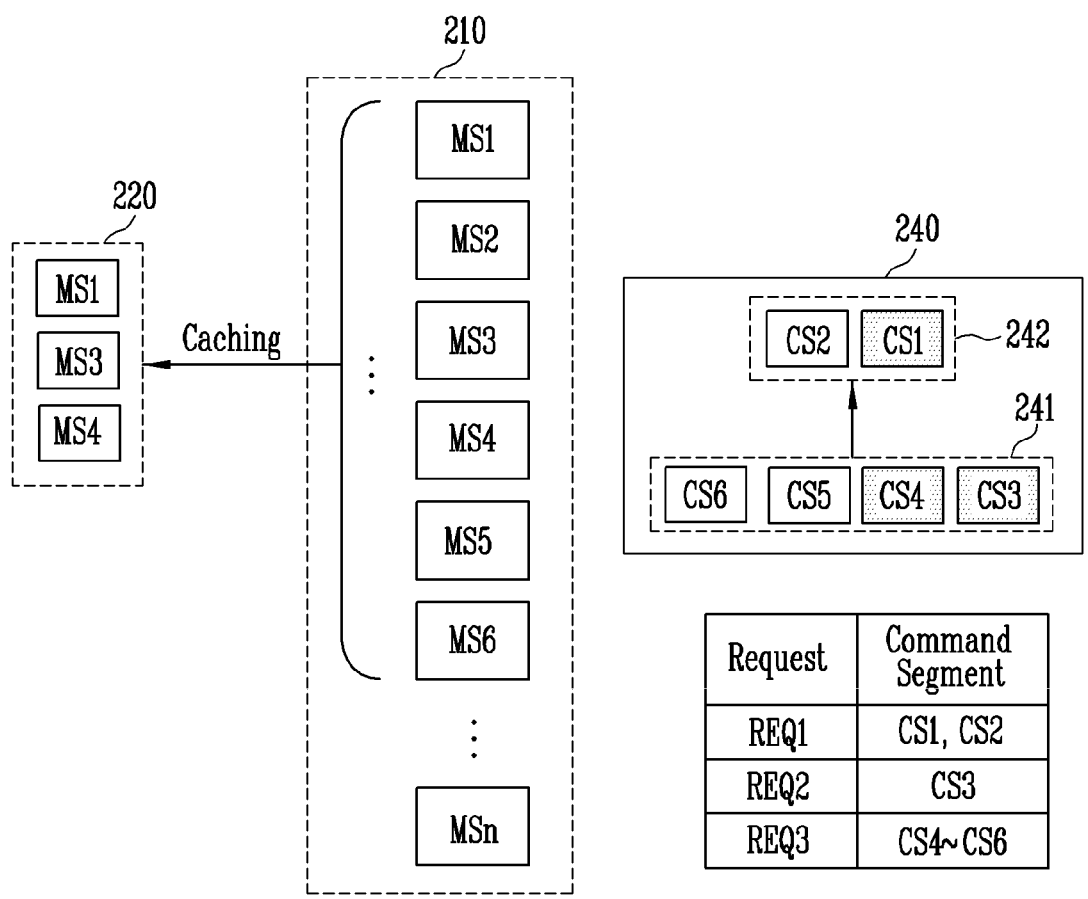
FIG. 7A illustrates caching of map segments according to an embodiment.

FIG. 7A is a diagram illustrating caching of map segments according to another embodiment.

Referring to FIG. 7A, the host interface controller 230, described above with reference to FIG. 3, may generate one or more command segments based on a request from a host 300. The host interface controller 230 may cache in the cache memory 220 a map segment corresponding to a first command segment of the one or more command segments from among pieces of mapping information stored in the buffer memory 210.

The host interface controller 230 may generate first and second command segments CS1 and CS2 based on a first request REQ1. The host interface controller 230 may cache in the cache memory 220 a first map segment MS1 corresponding to the first command segment CS1 from among the pieces of mapping information stored in the buffer memory 210, the first command segment CS1 being an initial command segment of the command segments generated based on the first request REQ1.

The host interface controller 230 may generate a third command segment CS3 based on a second request REQ2. The host interface controller 230 may cache in the cache memory 220 a third map segment MS3 corresponding to the generated third command segment CS3 from among the pieces of mapping information stored in the buffer memory 210, the third command segment CS3 being an initial command segment of the command segments generated based on the second request REQ2.

The host interface controller 230 may generate fourth to sixth command segments CS4 to CS6 based on a third request REQ3. The host interface controller 230 may cache in the cache memory 220 a fourth map segment MS4 corresponding to the fourth command segment CS4 from among the pieces of mapping information stored in the buffer memory 210, the fourth command segment CS4 being an initial command segment of the command segments generated based on the third request REQ3.

Figure 7B:
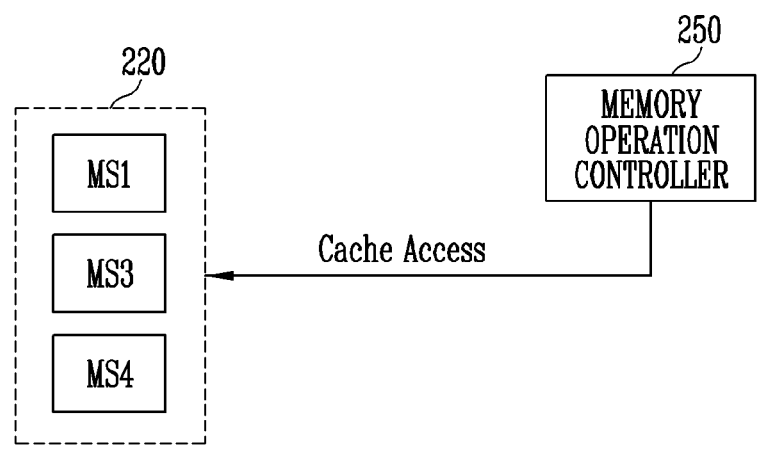
FIG. 7B illustrates cache access according to an embodiment.

FIG. 7B is a diagram illustrating cache access according to an embodiment of FIG. 7A.

Referring to FIG. 7B, first, third, and fourth map segments MS1, MS3, and MS4 are cached in the cache memory 220, and thus the first, third, and fourth command segments CS1, CS3, and CS4, described above with reference to FIG. 7A, may be processed in a cache hit condition.

Since second, fifth, and sixth map segments MS2, MS5, and MS6 are not cached in the cache memory 220, second, fifth, and sixth command segments CS2, CS5, and CS6, described above with reference to FIG. 7A, may be processed in a cache miss condition.

Since a logical address corresponding to the second command segment CS2 is consecutive to a logical address corresponding to the first command segment CS1, information of the second map segment MS2 may be easily determined, from the mapping information stored in the buffer memory 210, based on information about consecutiveness of logical addresses, even in a cache miss condition. For example, in an embodiment, a physical address of the second map segment MS2 corresponding to the second command segment CS2 may be determined by adding a physical address of the first map segment MS1 corresponding to the first command segment CS1 to the difference between a logical address of the second command segment CS2 and a logical address of the first command segment CS1. In this way, the second map segment MS2 for the second command segment CS2 next to the first command segment CS1 may be cached into the cache memory 220, using the cached first map segment MS1.

Similarly, because logical addresses at which the memory operation corresponding to the fifth and sixth command segments CS5 and CS6 are performed are consecutive to a logical address at which the memory operation corresponding to the fourth command segment CS4 is performed, the fifth and sixth map segments MS5 and MS6 may be easily acquired from the mapping information stored in the buffer memory 210 based on the continuity information of logical addresses, even in a cache miss condition.

That is, the host interface controller 230 may generate one or more command segments based on a single request. The host interface controller 230 may cache in the cache memory 220 a map segment corresponding to the first command segment of one or more command segments, rather than all of generated command segments, and thus the cache memory 220 having limited capacity may be efficiently utilized, and a cache hit ratio for map segments may be improved.

Figure 8:
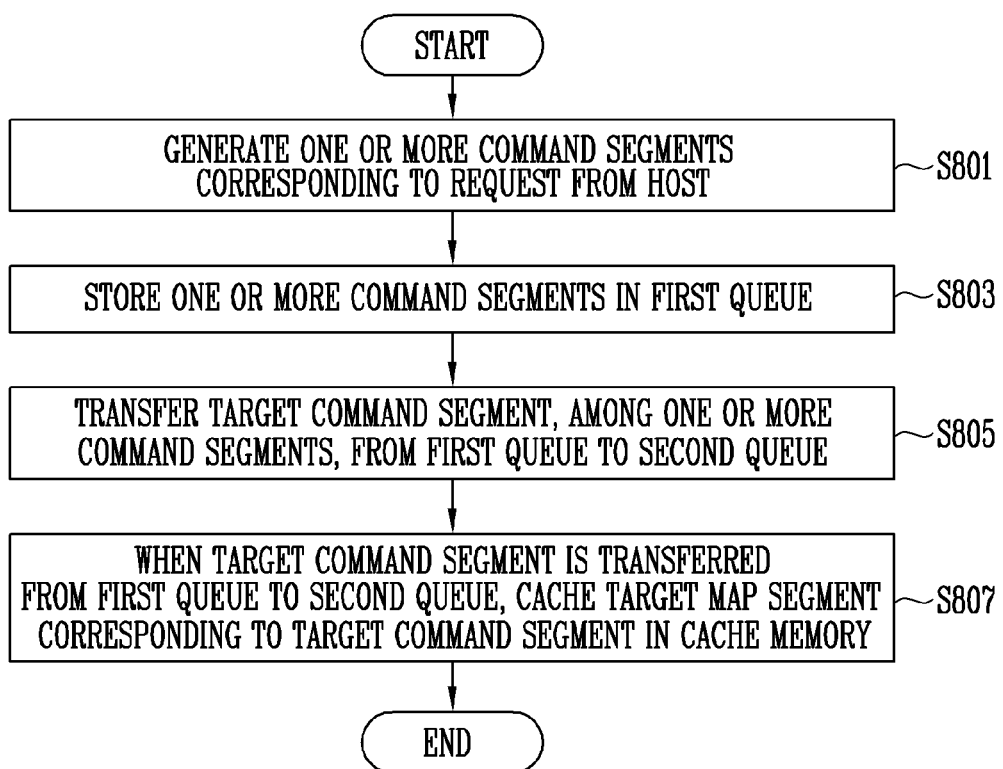
FIG. 8 is a flowchart illustrating a method of operating a memory controller according to an embodiment of the present disclosure.

FIG. 8 is a flowchart illustrating a method of operating a memory controller according to an embodiment of the present disclosure.

Referring to FIG. 8, at step S801, the memory controller may generate one or more command segments corresponding to a request from a host. The amount of data to be processed depending on one command segment may be variously set.

At step S803, the memory controller may store the generated one or more command segments in a first queue.

At step S805, the memory controller may transfer a target command segment from among the one or more command segments from the first queue to a second queue. When an available space is present in the second queue, the memory controller may transfer the command segments to the second queue in the order in which the command segments were input to the first queue.

At step S807, when a target command segment is transferred from the first queue to the second queue, the memory controller may cache a target map segment corresponding to the target command segment in a cache memory.

Figure 9:
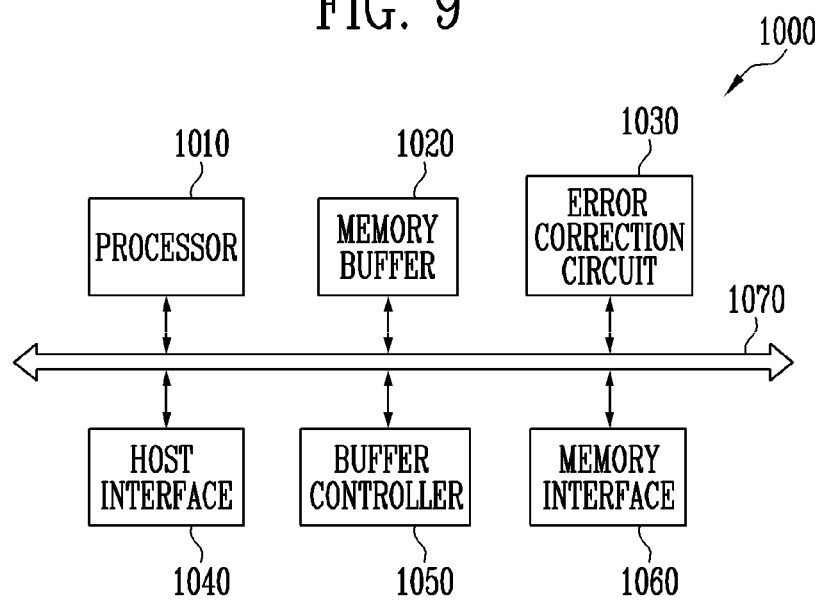
FIG. 9 illustrates an embodiment of the memory controller of FIG. 1.

FIG. 9 is a diagram illustrating an embodiment of the memory controller 1000 that may embody the memory controller 200 of FIG. 1.

The memory controller 1000 is coupled to a host and a memory device. In response to a request from the host, the memory controller 1000 may access the memory device. For example, the memory controller 1000 may control read, write, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error correction circuit (ECC) 1030, a host interface 1040, a buffer controller 1050, a memory interface 1060, and a bus 1070.

The bus 1070 may provide a channel between components of the memory controller 1000.

The processor 1010 may control the overall operation of the memory controller 1000 and perform a logical operation. The processor 1010 may communicate with an external host through the host interface 1040 and also communicate with the memory device through the memory interface 1060. Further, the processor 1010 may communicate with the memory buffer 1020 through the buffer controller 1050. The processor 1010 may control the operation of the storage device by using the memory buffer 1020 as a working memory, a cache memory, a buffer memory, or combinations thereof.

The processor 1010 may perform a function of a flash translation layer (FTL). The processor 1010 may translate a logical block address (LBA), provided by the host, into a physical block address (PBA) through the FTL. The FTL may receive the LBA and translate the LBA into the PBA using a mapping table. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor may derandomize the data received from the memory device during a read operation. For example, the processor 1010 may derandomize the data received from the memory device using a derandomizing seed. Derandomized data may be output to the host.

In an embodiment, the processor 1010 may run software or firmware to perform the randomizing or derandomizing operation.

The memory buffer 1020 may be used as a working memory, a cache memory, or a buffer memory of the processor 1010. The memory buffer 1020 may store codes and commands that are executed by the processor 1010. The memory buffer 1020 may store data that is processed by the processor 1010. The memory buffer 1020 may include a static RAM (SRAM) or a dynamic RAM (DRAM).

The error correction circuit 1030 may perform error correction. The error correction circuit 1030 may perform error correction code (ECC) encoding based on data to be written to the memory device through the memory interface 1060. The ECC-encoded data may be transferred to the memory device through the memory interface 1060. The error correction circuit 1030 may perform ECC decoding based on data received from the memory device through the memory interface 1060. In an example, the error correction circuit 1030 may be included as a component of the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Non-Volatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer controller 1050 may control the memory buffer 1020 under the control of the processor 1010.

The memory interface 1060 may communicate with the memory device under the control of the processor 1010. The memory interface 1060 may transmit and receive commands, addresses, and data to and from the memory device through channels.

In an embodiment, the memory controller 1000 may not include the memory buffer 1020 and the buffer controller 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may transmit data in the memory controller 1000, and the control bus may transmit control information, such as commands or addresses, in the memory controller 1000. The data bus and the control bus may be separated from each other, and may neither interfere with each other nor influence each other. The data bus may be coupled to the host interface 1040, the buffer controller 1050, the error correction circuit 1030, and the memory interface 1060. The control bus may be coupled to the host interface 1040, the processor 1010, the buffer controller 1050, the memory buffer 1020, and the memory interface 1060.

In an embodiment, the host interface controller 230 of FIG. 2 may be embodied by the host interface 1040. The buffer memory 210, the cache memory 220, and the command queue 240 of FIG. 2 may be embodied by the memory buffer 1020. The memory operation controller 250 of FIG. 2 may be embodied by the processor 1010.

Figure 10:
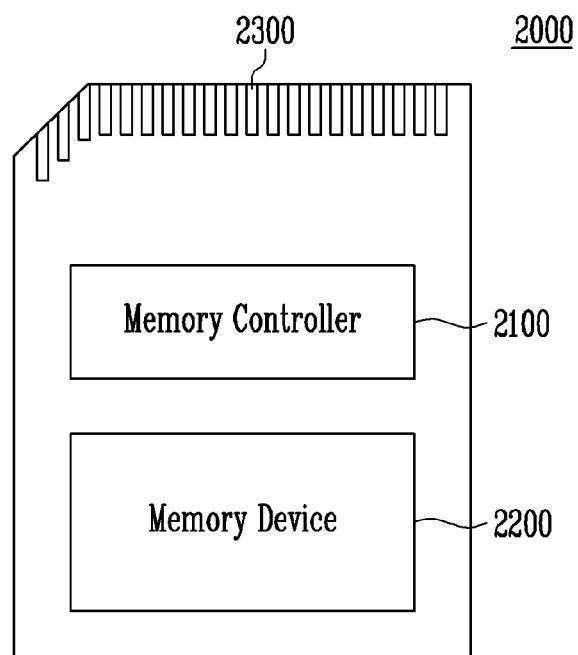
FIG. 10 illustrates a memory card system to which a storage device according to an embodiment of the present disclosure is applied.

FIG. 10 is a block diagram illustrating a memory card system 2000 to which a storage device according to an embodiment of the present disclosure is applied.

The memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same manner as the memory controller 200, described above with reference to FIG. 1.

In an embodiment, the memory controller 2100 may include components, such as a RAM, a processor, a host interface, a memory interface, and an error correction circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various interface protocols such as universal serial bus (USB), multimedia card (MMC), embedded MMC (eMMC), peripheral component interconnection (PCI), PCI-express (PCI-E), an advanced technology attachment (ATA) protocol, a serial-ATA (SATA), parallel-ATA (PATA), small computer small interface (SCSI), enhanced small disk interface (ESDI), integrated drive electronics (IDE), firewire, universal flash storage (UFS), WIFI, Bluetooth, and non-volatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin-Torque Magnetic RAM (STT-MRAM).

The memory controller 2100 and the memory device 2200 may be integrated into a single semiconductor device to form a memory card. For example, the memory controller 2100 and the memory device 2200 may be integrated into a single semiconductor device and may then form a memory card such as a personal computer memory card international association (PCMCIA), a compact flash card (CF), a smart media card (SM or SMC), a memory stick multimedia card (MMC, RS-MMC, MMCmicro or eMMC), an SD card (SD, miniSD, microSD, or SDHC), a universal flash storage (UFS), or the like.

Figure 11:
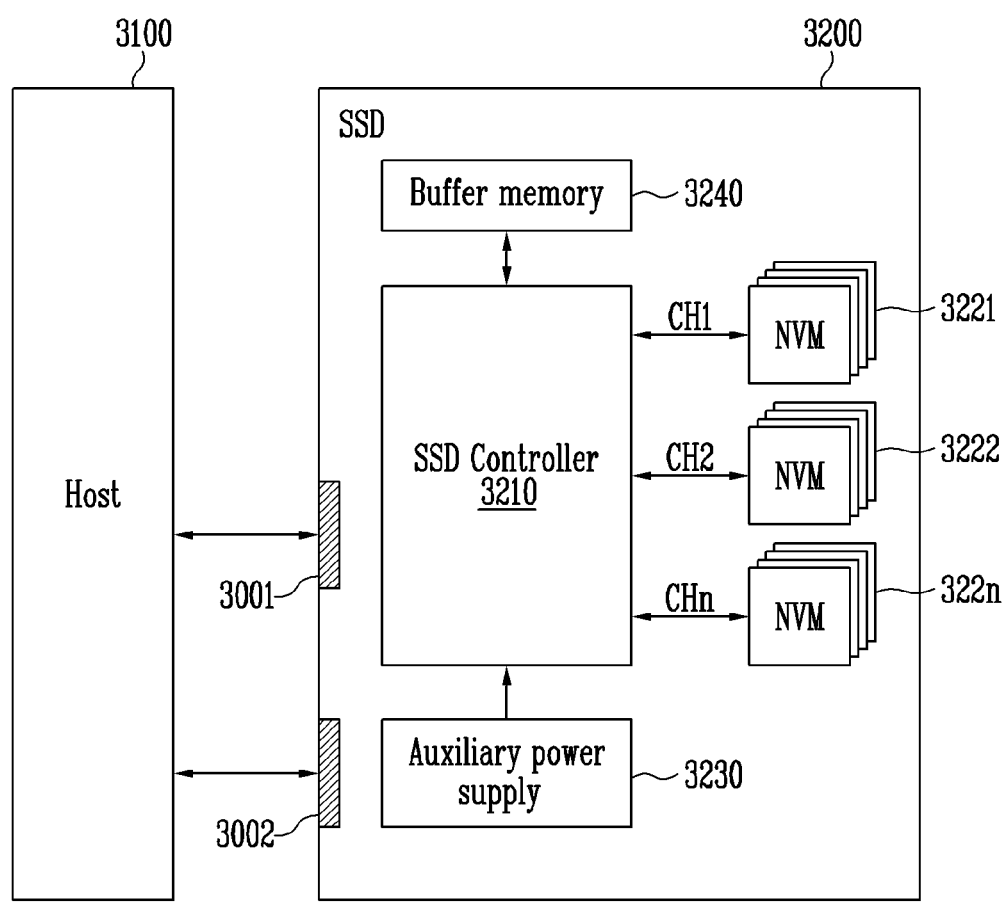
FIG. 11 illustrates a solid state drive (SSD) system to which a storage device according to an embodiment of the present disclosure is applied.

FIG. 11 is a block diagram illustrating a solid state drive (SSD) system 3000 to which a storage device according to an embodiment of the present disclosure is applied.

The SSD system 3000 may include a host 3100 and an SSD 3200. The SSD 3200 may exchange a signal SIG with the host 3100 through a signal connector 3001, and may receive power PWR through a power connector 3002. The SSD 3200 may include an SSD controller 3210, a plurality of flash memories 3221 to 322*n*, an auxiliary power supply 3230, and a buffer memory 3240.

In accordance with an embodiment of the present disclosure, the SSD controller 3210 may perform the function of the memory controller 200, described above with reference to FIG. 1.

The SSD controller 3210 may control the plurality of flash memories 3221 to 322*n* in response to the signal SIG received from the host 3100. In an embodiment, the signal SIG may indicate signals based on the interfaces of the host 3100 and the SSD 3200. For example, the signal SIG may be a signal defined by at least one of various interfaces such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer small interface (SCSI), enhanced small disk interface (ESDI), integrated drive electronics (IDE), firewire, universal flash storage (UFS), WiFi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be located inside the SSD 3200 or located outside the SSD 3200. For example, the auxiliary power supply 3230 may be located in a main board, and may also provide auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322*n*, or may temporarily store metadata (e.g., mapping tables) of the flash memories 3221 to 322*n*. The buffer memory 3240 may include volatile memories, such as DRAM, SDRAM, DDR SDRAM, LPDDR SDRAM, and GRAM, or nonvolatile memories, such as FRAM, ReRAM, STT-MRAM, and PRAM.

Figure 12:
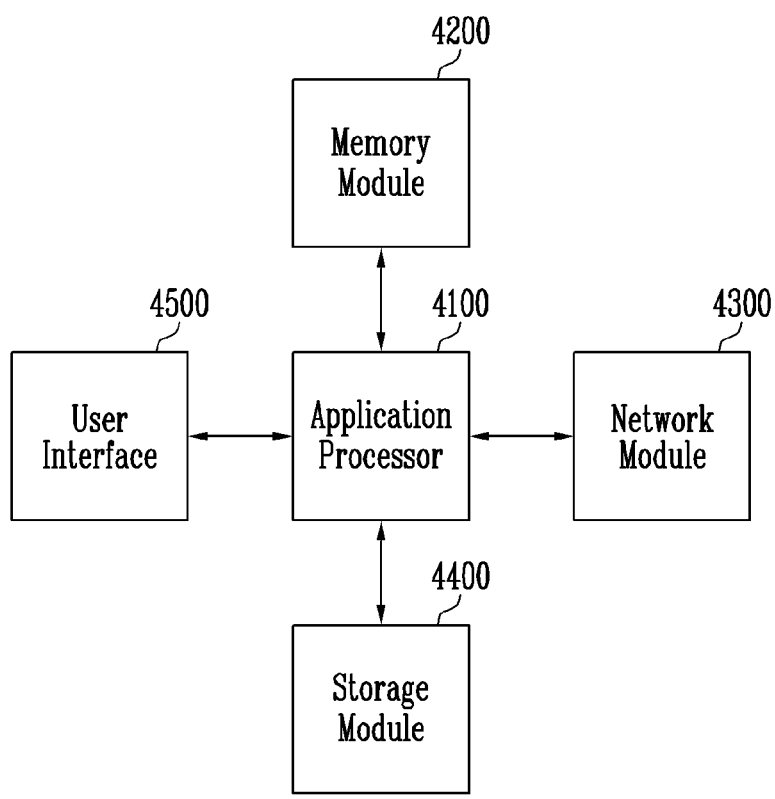
FIG. 12 illustrates a user system to which a storage device according to an embodiment of the present disclosure is applied.

FIG. 12 is a block diagram illustrating a user system 4000 to which a storage device according to an embodiment of the present disclosure is applied.

The user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be formed of a system-on-chip (SoC).

The memory module 4200 may act as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM or nonvolatile RAMs such as PRAM, ReRAM, MRAM, and FRAM. In an embodiment, the application processor 4100 and the memory module 4200 may be packaged based on a package-on-package (POP), and may then be provided as a single semiconductor package.

The network module 4300 may communicate with external devices. In an embodiment, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), Wimax, WLAN, Ultra-Wideband (UWB), Bluetooth, or WI-FI. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (removable drive), such as a memory card or an external drive of the user system 4000.

In an embodiment, the storage module 4400 may include a plurality of nonvolatile memory devices, each of which may be operated in the same manner as the memory device 100, described above with reference to FIG. 1. The storage module 4400 may be operated in the same manner as the storage device 50, described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there are provided a memory controller having improved map caching performance and a method of operating the memory controller.

What is claimed is:

1. A memory controller, comprising:
a host interface controller configured to generate, based on a request received from a host, one or more command segments corresponding to the request;
a first queue configured to store the one or more command segments;
a second queue configured to store a target command segment from among the one or more command segments;
a buffer memory configured to store logical-to-physical address mapping information received from a memory device; and
a cache memory,
wherein the memory controller caches a target map segment corresponding to the target command segment from the buffer memory into the cache memory, in response to a transfer of the target command segment from the first queue to the second queue.

2. The memory controller according to claim 1,
wherein the host interface controller caches the target map segment from among pieces of the logical-to-physical address mapping information stored in the buffer memory into the cache memory, and
wherein the target map segment includes information about an address at which a memory operation corresponding to the target command segment is to be performed.

3. The memory controller according to claim 2, further comprising:
a memory operation controller configured to control the memory device to perform the memory operation based on the target map segment cached in the cache memory, in response to the target command segment received from the second queue.

4. The memory controller according to claim 3, wherein the host interface controller caches a map segment corresponding to a first command segment from among the one or more command segments as the target map segment into the cache memory.

5. The memory controller according to claim 4, wherein the memory operation controller caches map segments corresponding to remaining command segments other than the first command segment, among the one or more command segments, in the cache memory.

6. The memory controller according to claim 4, wherein the host interface controller receives one or more logical address segments respectively corresponding to the one or more command segments with the request.

7. The memory controller according to claim 6, wherein an order of the one or more command segments is determined based on a range of logical address segments corresponding to the one or more command segments.

8. The memory controller according to claim 3, wherein the memory operation controller controls the memory device to perform a device management operation based on management initiation information.

9. The memory controller according to claim 8, wherein the management initiation information includes at least one of size information of data received from the host and timer information initialized whenever the device management operation is performed.

10. The memory controller according to claim 8, wherein the device management operation includes at least one of a block erase operation of securing a block in which write data is to be stored, a garbage collection operation of securing a free block, and a map update operation of flushing the mapping information stored in the buffer memory into the memory device.

11. The memory controller according to claim 8, wherein the memory operation controller controls the memory device to perform the memory operation corresponding to the target command segment received from the second queue while the device management operation is not being performed.

12. A method of operating a memory controller, the memory controller including a first queue, a second queue, a cache memory, a buffer memory, and a host interface controller, the method comprising:
generating, by the host interface controller based on a request from a host, one or more command segments corresponding to the request;
storing the one or more command segments in the first queue;
transferring a target command segment, among the one or more command segments, from the first queue to the second queue; and
caching, by the host interface controller, a target map segment corresponding to the target command segment from the buffer memory into the cache memory, in response to a transfer of the target command segment from the first queue to the second queue,
wherein the buffer memory stores logical-to-physical address mapping information received from a memory device.

13. The method according to claim 12, wherein:
caching the target map segment in the cache memory comprises caching the target map segment from among pieces of the logical-to-physical address mapping information stored in the buffer memory into the cache memory, and
the target map segment includes information about an address at which a memory operation corresponding to the target command segment is to be performed.

14. The method according to claim 13, wherein the target map segment is a map segment corresponding to a first command segment from among the one or more command segments.

15. The method according to claim 14, further comprising:
caching the logical-to-physical address mapping information for a command segment next to the target command segment into the cache memory, using the cached target map segment.

16. The method according to claim 13, further comprising:
controlling the memory device to perform the memory operation based on the target map segment cached in the cache memory in response to the target command segment.

17. A memory controller for controlling a memory device, comprising:
a host interface controller configured to generate, based on a request received from a host, one or more command segments corresponding to the request;
a memory operation controller configured to control an operation of the memory device based on a target command segment, among the one or more command segments;
a buffer memory configured to store pieces of logical-to-physical address mapping information of the memory device; and
a cache memory,
wherein the host interface controller caches a target map segment corresponding to the target command segment from among the pieces of logical-to-physical address mapping information stored in the buffer memory into the cache memory, and
wherein the memory operation controller caches map segments corresponding to remaining command segments other than the target command segment of the one or more command segments from among the pieces of logical-to-physical address mapping information stored in the buffer memory into the cache memory.

18. The memory controller according to claim 17, further comprising:
a first queue configured to store the one or more command segments received from the host interface controller; and
a second queue configured to receive the target command segment from the first queue and provide the target command segment to the memory operation controller.

19. The memory controller according to claim 17, wherein:
the host interface controller receives logical address segments respectively corresponding to the one or more command segments from the host, and
an order of the one or more command segments is determined based on a range of logical address segments corresponding to the one or more command segments.

20. The memory controller according to claim 19, wherein the target map segment includes a map segment corresponding to a first-ordered command segment from among the one or more command segments.

* * * * *